Oct. 20, 1931.  H. L. GUY  1,828,407
TURBINE SUPPORT
Filed June 28, 1929  2 Sheets-Sheet 1

INVENTOR
H. L. GUY.
BY a. B. Reavis
ATTORNEY

Oct. 20, 1931.  H. L. GUY  1,828,407
TURBINE SUPPORT
Filed June 28, 1929    2 Sheets-Sheet 2

INVENTOR
H. L. GUY.
BY
ATTORNEY

Patented Oct. 20, 1931

1,828,407

UNITED STATES PATENT OFFICE

HENRY LEWIS GUY, OF HALE, ENGLAND, ASSIGNOR TO WESTINGHOUSE ELECTRIC & MANUFACTURING COMPANY, A CORPORATION OF PENNSYLVANIA

TURBINE SUPPORT

Application filed June 28, 1929, Serial No. 374,542, and in Great Britain July 19, 1928.

This invention relates to elastic fluid turbines and concerns more particularly the means for supporting the turbine cylinder.

A common method of supporting a turbine cylinder is to provide separate pedestals to carry the shaft bearings, and to support the cylinder on said pedestals through the intermediary of lugs, projecting arms or the like, adapted to seat upon appropriate bearing surfaces formed on or carried by the pedestals on opposite sides of the turbine axis. With the object of permitting the free expansion of the cylinder in a direction radially in accordance with the temperature changes but to maintain the center longitudinal axis of the casing truly in alignment with the axis of the shaft bearings in spite of the differences in expansion due to differences in temperature of the cylinder and pedestals, it has been customary to dispose the bearing surfaces in horizontal planes as near as possible to the central horizontal plane of the cylinder or else to arrange the bearing surfaces in radial planes containing the longitudinal axis of the turbine shaft and equally inclined on opposite sides thereof, in which latter event it is immaterial whether the bearing surfaces are relatively near to said central plane or substantially displaced therefrom.

The present invention similarly has the object of maintaining proper alignment between the shaft bearings and cylinder irrespective of the different expansion effects, but more accurately than by the previous arrangements, and according thereto the bearing surfaces for the cylinder are disposed neither horizontally nor radially of the turbine axis, but are arranged in inclined planes which intersect at a point somewhat displaced vertically from the axis of the shaft, for the purpose of compensating for the difference in temperature which exists between the body of the cylinder and the bearing surfaces thereof.

For a more complete understanding of the nature of the invention it may be explained that the invention results from the appreciation of the fact that a temperature gradient exists between the body of the cylinder and the bearing surfaces of the supporting arms, lugs or the like thereon and if the bearing surfaces are truly radial, the expansion and consequent movement of the body of the cylinder will not be the same as the expansion and consequent movement of the portions of the arms and lugs adjacent the bearing surfaces. By the present invention the bearing surfaces are so disposed as to compensate more accurately for this difference in expansion and so maintain the axis of the turbine cylinder more closely in alignment with the axis of the shaft at all times.

These and other objects are effected by my invention, as will be apparent from the following description and claims taken in connection with the accompanying drawings, forming a part of this application, in which:

Figure 1:
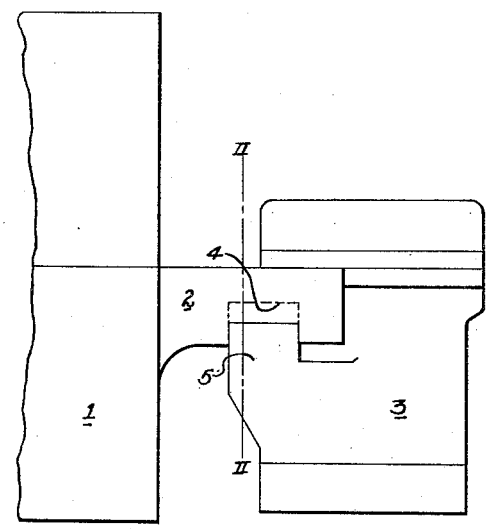
Fig. 1 is a side elevation showing more or less diagrammatically the end portion of a turbine cylinder and its supporting pedestal.
Figure 2:
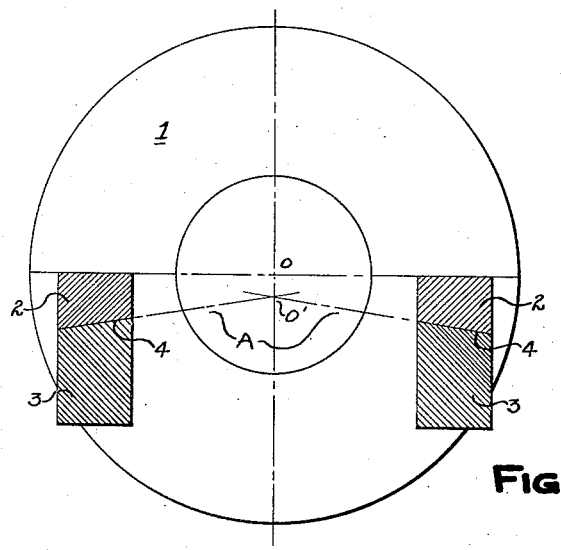
Fig. 2 is a cross-section corresponding to line II—II of Fig. 1.

Referring more particularly to Figs. 1 and 2, a cylinder 1 is shown, the lower half of which has outstanding arms or lugs 2 whereby it is supported upon a pedestal 3. If, when the turbine is put into operation, the lug 2 and the cylinder 1 are maintained at equal temperatures throughout, and both of these parts expand equally in directions radially outward from the cylinder axis O, while the temperature of the pedestal 3 is the same throughout, it is evident that by arranging the contacting bearing surfaces 4 of the lugs 2 and the pedestal 3 upon equally inclined planes which pass through the axis O, expansion or contraction of the cylinder may take place freely without any displacement of said axis with respect to the pedestal.

In practice however, these conditions cannot conveniently be realized. With a construction such as shown there will be a substantial fall of temperature along the length of the lugs 2 when the turbine is heated, and consequently the expansion due to heating will not be the same at the free end of the lug 2 as it is at the place where the lug adjoins the body of the cylinder. It follows that if the bearing surfaces 4 are machined so as to coincide with radial planes, the expansion in a vertical direction of the portions of the lugs above the bearing surfaces will not be sufficient to compensate for the outward movement of the lugs due to the expansion of the cylinder, and therefore, the axis of the heated cylinder will be lowered from its original position and will no longer coincide with the axis of the rotor bearings in the pedestals.

On the other hand, in cases where the bearing surfaces on the lugs are horizontal (or both in a plane parallel to a plane containing the axis of the turbine, even though the said surfaces are disposed as near as conveniently possible to the horizontal joint of the cylinder, the expansion of the lugs on heating will serve to raise the cylinder and so carry its axis above that of the rotor bearings.

While this deflection of the cylinder axis may not be very material in cases where the turbine operates with motive fluid of relatively low temperature, and temperature differences are therefore small, it may lead to serious consequences in turbines operated at high temperatures. The present invention however, proposes to compensate at least in part, for the above mentioned tendency to shift the cylinder axis out of coincidence with the rotor axis such as would occur if horizontal or radial bearing surfaces were employed, and accordingly the bearing surfaces are disposed in inclined places, such as indicated by the dotted lines A in Fig. 2, the intersection O' of which is displaced somewhat vertically relatively to the turbine axis O.

Figure 3:
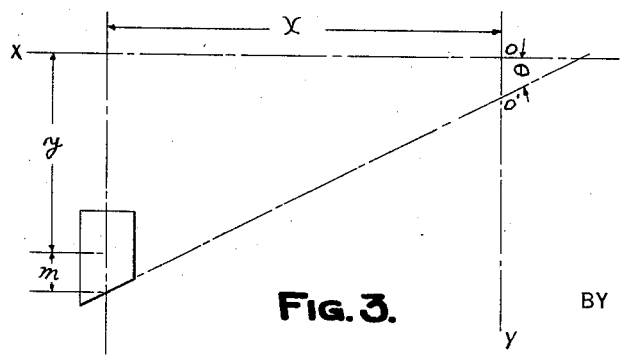
Fig. 3 is a diagram illustrating the invention.

The following consideration with reference to Fig. 3 will serve to indicate in what manner a suitable value for the inclination of the bearing surfaces may be arrived at. The desired shape and disposition of the lugs on the lower half of the cylinder will be approximately known, and the approximate temperatures of the body of the cylinder and the bearing portions of the supporting arms or lugs under working conditions can be judged from previous experience or determined experimentally; let these be $T_1$ and $T_2$ respectively. The values of $T_1$ and $T_2$ should be taken in terms of degrees above room temperature, as it is the increase in temperature above room temperature which causes the expansion that must be compensated.

Now Fig. 3 represents a vertical plane through the bearing surfaces, OX represents the horizontal plane and OY the vertical plane through the turbine axis. The lug 2 has its center of area at a distance $x$ from OY and a distance $y$ from OX, while the vertical distance of said center of area from the bearing surface 4 is $m$. Then the required angle $\theta$ between the bearing surface and the horizontal plane OX will be given very closely by the formula:

$$\theta = \mathrm{Cot}^{-1}\frac{xT_1}{yT_1 + mT_2}$$

The planes of the two bearing surfaces will thus intersect at O' somewhat below the axis O of the cylinder, and at the place of intersection they will each make an angle $90° - \theta°$ with the vertical plane OY.

In practice it may be desirable to make the angle $\theta$ slightly greater than that given by the above formula in order to allow for the slight difference in temperature between the portion 5 of the pedestal 3 (Fig. 1) immediately below the bearing surface 4 and the main body of the pedestal lying below the rotor bearing.

Figure 4:
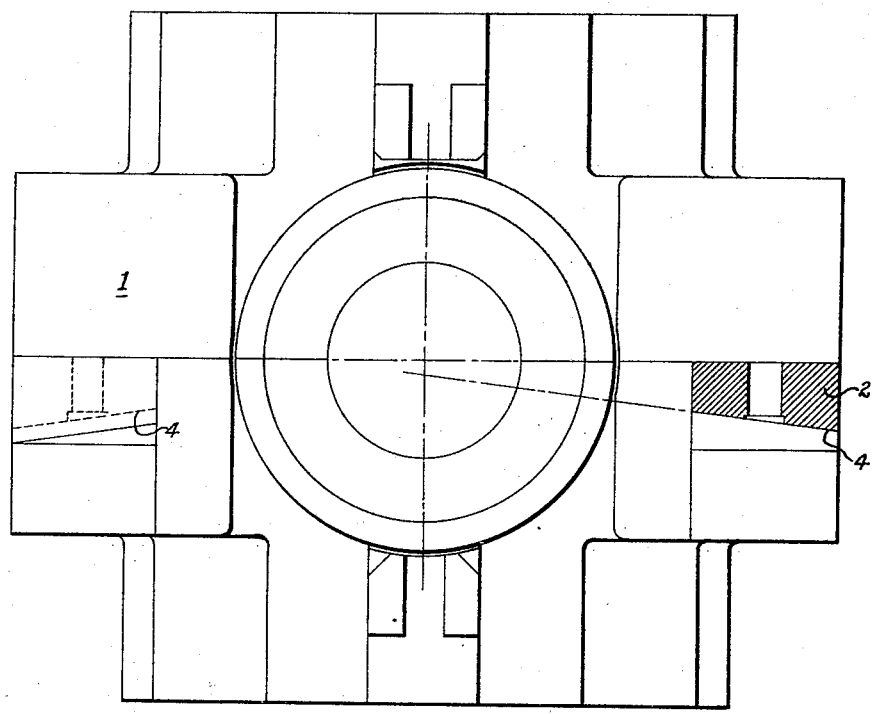
Figs. 4, 5 and 6 are respectively an end view with the right-hand lug shown in section on line IV—IV of Fig. 5, a side elevation, and a part plan with the upper half cylinder removed, showing a portion of a turbine cylinder embodying the invention.
Figures 5, 6:
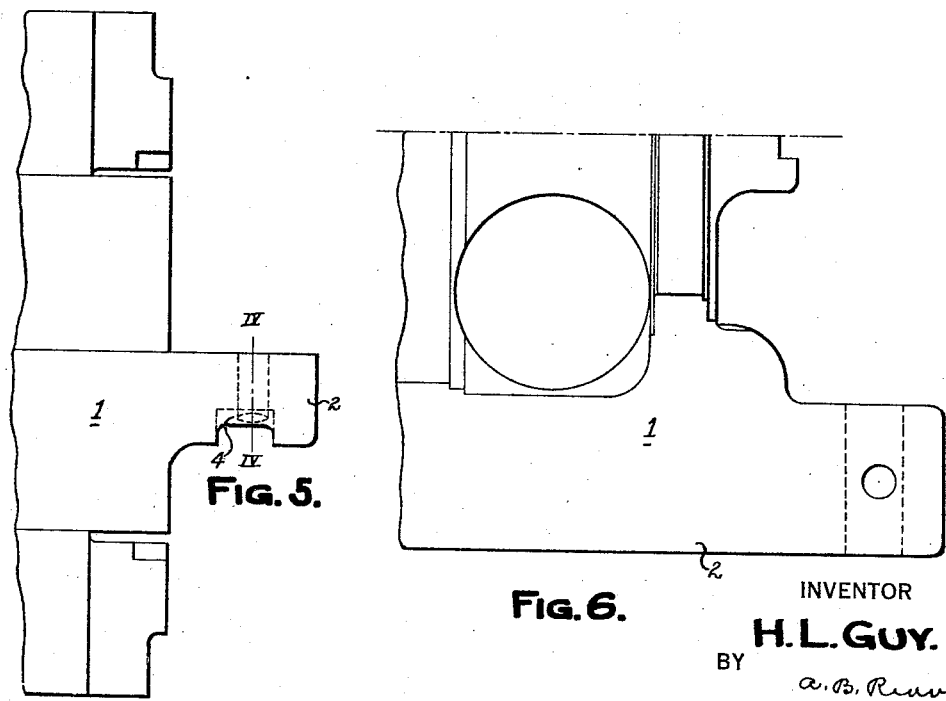

A practical embodiment of the invention is illustrated to scale in Figs. 4, 5 and 6. The distance between the center line of the cylinder and the center of the lugs 4 is 21 inches, the normal temperature of the motive fluid entering the cylinder is 800° F. or thereabouts, the inclination of the bearing surfaces 4 to the horizontal is 7½° and the planes of the surfaces intersect at a distance of three-quarters of an inch below the axis of the turbine. In this case the increase above room temperature of the cylinder at the end where it adjoins the lug is nearly twice the increase of temperature which takes place at the bearing surfaces 4.

It will be evident that the invention is not limited in its application to any one constructional form of the bearing surfaces, but may be equally well utilized, whether plain surfaces are employed or bearings embodying fixed or sliding keys or like arrangements such as are known in turbine practice. Also while it may generally be preferred to dispose the lugs with their bearing surfaces relatively near to the central horizontal plane of the cylinder, the invention permits the position of the supports or bearings to be disposed in other desired positions without giving rise to misalignment difficulties.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A turbine comprising a cylinder, a supporting structure having bearing surfaces inclined relative to each other, and lugs carried by the casing and resting on said bearing surfaces, the intersection of said surfaces lying in the vertical plane of the turbine axis and near to the axis but spaced therefrom an amount compensating for the difference in expansion between the body of the cylinder and the bearing portion of the lug due to difference in temperature of the cylinder and the lug.

2. A turbine comprising a cylinder having lugs for supporting the cylinder, a supporting structure having bearing surfaces upon which said lugs are supported, said bearing surfaces being inclined relative to each other and their intersection being vertically spaced from the turbine axis, the angle of inclination of each surface being approximately given by the formula:

$$\theta = \mathrm{Cot}^{-1}\frac{xT_1}{yT_1 + mT_2}$$

in which $\theta$ is the angle of the bearing surface relative to a horizontal plane $x$, is the horizontal distance from the vertical plane of the turbine axis to the center of area of the lug, $y$ is the vertical distance from the horizontal plane of the axis to said center of area, $m$ is the distance from said center of area to the bearing surface in the vertical plane of said center of area, $T_1$ is the increase in temperature above room temperature of the body of the cylinder and $T_2$ is the increase in temperature above room temperature of the bearing portion of the lug.

3. A turbine comprising a cylinder and a supporting structure therefor, the cylinder being supported on the supporting structure along bearing surfaces which are inclined relative to each other and whose intersection lies in the vertical plane of the turbine axis and near to the axis but spaced therefrom an amount compensating for the differences in expansion of the parts of the cylinder and also the supporting structure contacting therewith which parts determine the position of the cylinder.

4. A turbine comprising a cylinder, a supporting structure having bearing surfaces inclined relative to each other, and lugs carried by the casing and resting on said bearing surfaces, the projections of said bearing surfaces passing near to the turbine axis but spaced therefrom by an amount which compensates for the difference in expansion between the body of the cylinder and the lug due to differences in temperature of the body and the lug.

In testimony whereof, I have hereunto subscribed my name this 10th day of June, 1929.

HENRY LEWIS GUY.